Figure 2:
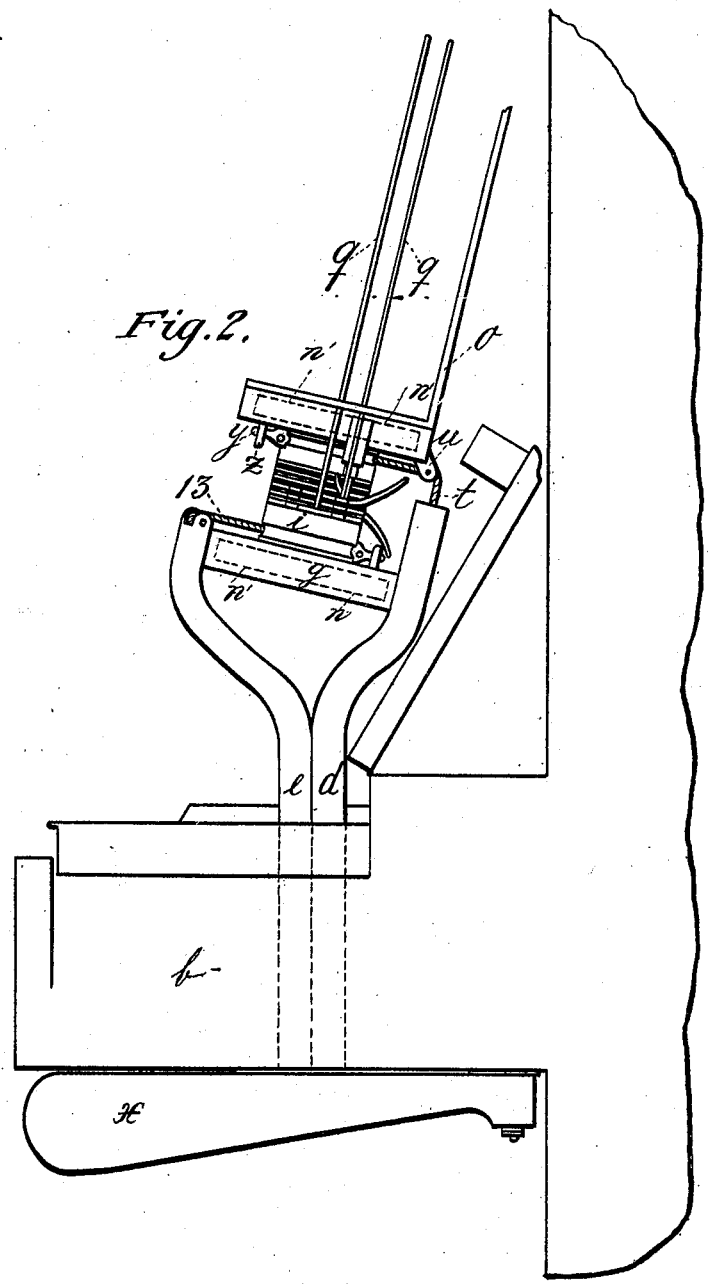

No. 689,108. Patented Dec. 17, 1901.
E. J. MÖLLER.
MUSIC LEAF TURNER.
(Application filed Jan. 7, 1901.)
(No Model.) 5 Sheets—Sheet 1.
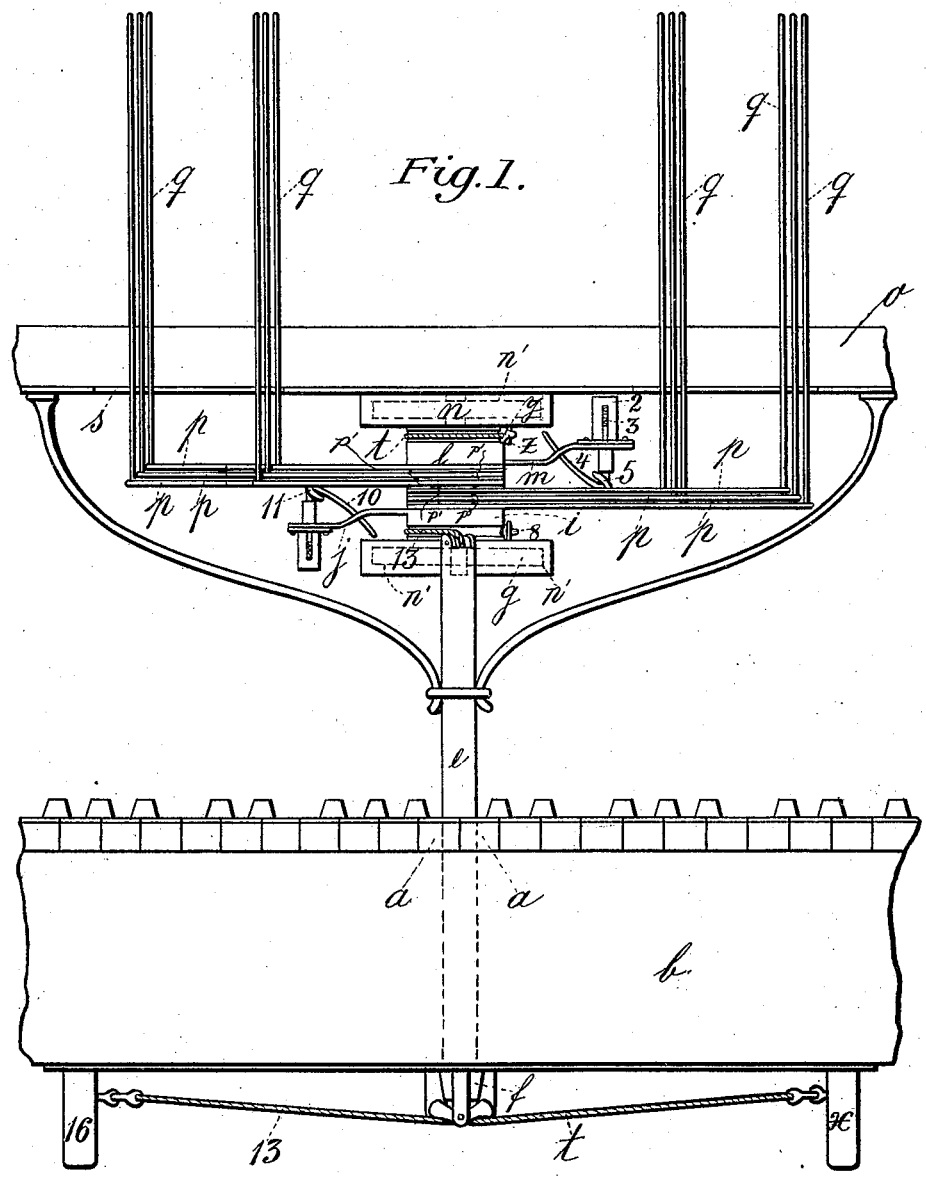
Fig. 1.
Witnesses
Paul Hunter
John Lotka
Inventor
Emil J. Möller
By 
Attorneys No. 689,108. Patented Dec. 17, 1901.
E. J. MÖLLER.
MUSIC LEAF TURNER.
(Application filed Jan. 7, 1901.)
(No Model.) 5 Sheets—Sheet 2.

No. 689,108. Patented Dec. 17, 1901.
E. J. MÖLLER.
MUSIC LEAF TURNER.
(Application filed Jan. 7, 1901.)
(No Model.)
5 Sheets—Sheet 3.
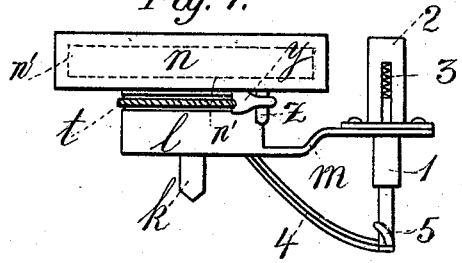
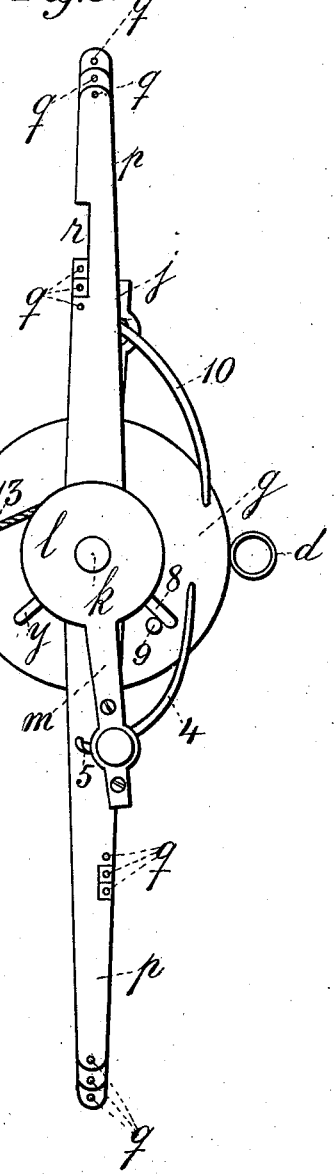
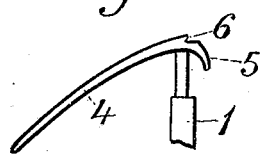
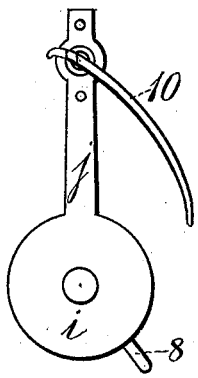
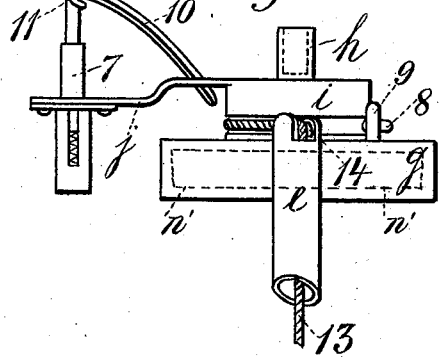
Witnesses
Paul Hunter
John Lotka
Inventor
Emil J. Möller
By Munn
Attorneys No. 689,108. Patented Dec. 17, 1901.
E. J. MÖLLER.
MUSIC LEAF TURNER.
(Application filed Jan. 7, 1901.)
(No Model.) 5 Sheets—Sheet 4.
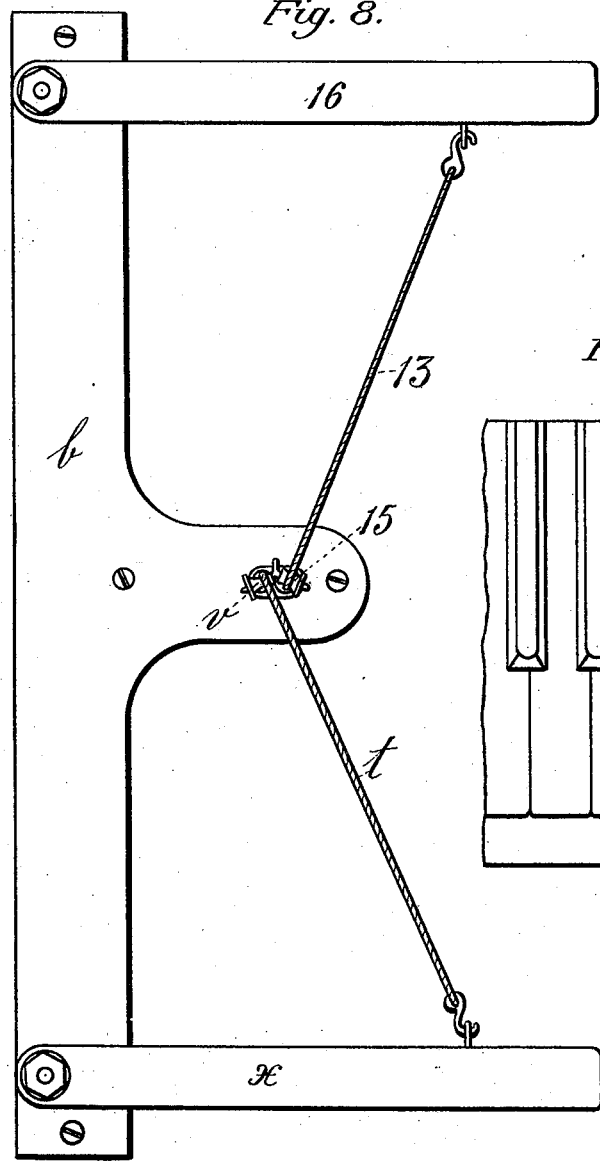
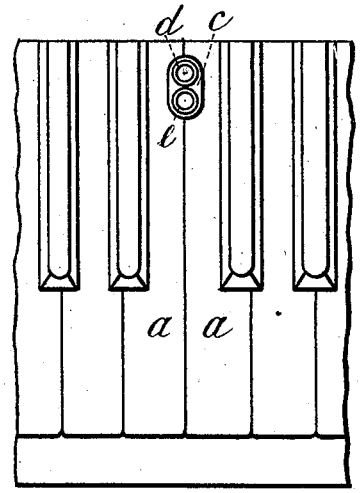
Witnesses
Paul Hunter
John Lotka
Inventor
Emil J. Möller
By
Attorneys

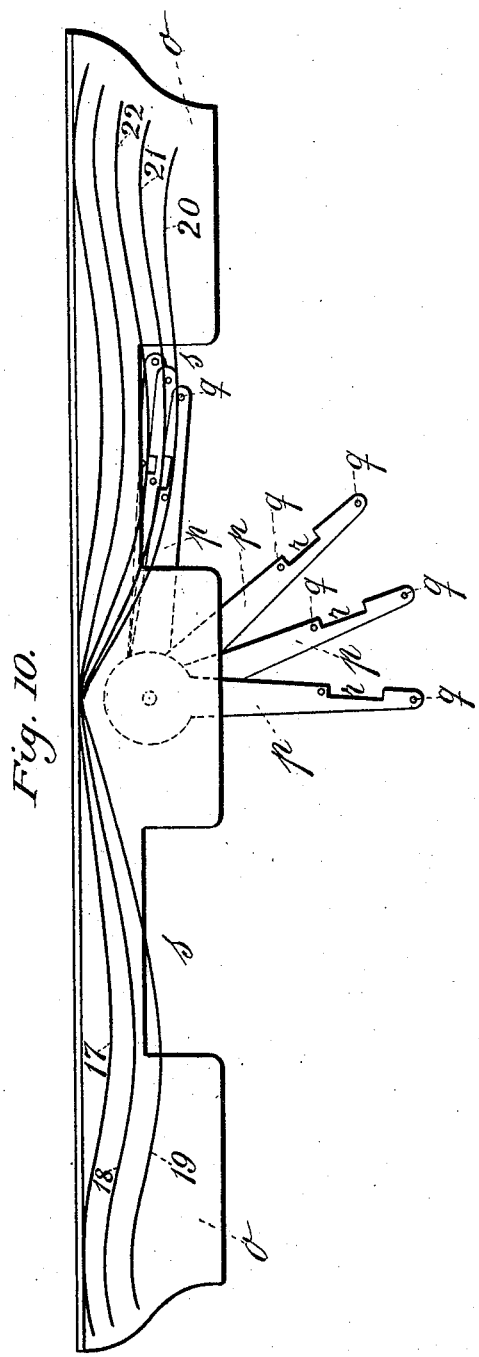

UNITED STATES PATENT OFFICE.

EMIL JULIUS MÖLLER, OF MARYBOROUGH, QUEENSLAND.

MUSIC-LEAF TURNER.

SPECIFICATION forming part of Letters Patent No. 689,108, dated December 17, 1901.

Application filed January 7, 1901. Serial No. 42,382. (No model.)

*To all whom it may concern:*

Be it known that I, EMIL JULIUS MÖLLER, artist, a citizen of the Colony of Queensland, and a resident of Alice street, Maryborough, Queensland, have invented certain new and useful Improvements in Music-Leaf Turners, of which the following is a specification.

The object of this invention is an apparatus for turning music-leaves automatically. It works in this manner that when a musician wishes to turn a leaf this is done simply by pressing a pedal or knee-lever by the knee on a piano or by the foot on a music-stand for violin or other instruments. The apparatus is constructed in such a manner that it can also turn the leaves back if repetition of the music is required.

The apparatus consists in the main of a number of arms, each of which carries two upright fingers, between which the leaf is placed. The one end of the arms is placed on a vertical spindle, on which they are worked forward and backward by a suitable mechanism.

The invention is shown in the drawings as follows:

Figures 1 and 2 are front and side views of a music-leaf turner fixed in position on a piano. Fig. 3 is a plan of the mechanism for moving the arms from right to left, and vice versa. Figs. 4 to 7 are details of the same mechanism. Fig. 8 shows pedals (knee-levers) as fixed underneath the keyboard with the connecting-cords between the turning mechanism and the pedals. Fig. 9 shows how the leaf-turner is fixed on a piano, showing center part of the keyboard, in which is arranged an oblong hole, through which the two tubes $d$ and $e$ pass. Fig. 10 is a plan of a music-desk with a book placed on same with three leaves placed in position between the fingers and with three arms drawn out in front ready to receive the leaves.

Through the two center keys $a$ of a piano and the keyboard $b$ is bored an oblong hole $c$, Fig. 9, for the passage of two tubes $d$ and $e$, whose lower ends rest in the cone-shaped socket $f$, that carries the whole apparatus and is fixed underneath the keyboard. These tubes are arranged alongside each other until a few inches above the keys, where $d$ is bent inward, and $e$ outward, and between the upper extremities of these tubes is fixed a cylindrical box $g$, in the center of which is placed the vertical spindle $h$, Fig. 5. On top of the box $g$ and connected to the spindle $h$ is placed a horizontal pulley $i$, that carries the arm $j$, by means of which the music-leaves are turned back from left to right. The spindle $h$ reaches a little above the pulley $i$ and has in the top a cavity bored so as to fit around the lower part of another vertical spindle $k$, Fig. 7. On this spindle $k$ is fixed a pulley $l$ with an arm $m$, by means of which the leaves are turned over from right to left. The spindle $k$, whose lower end works freely in the cavity of the top end of spindle $h$, passes through the center of pulley $l$, fixed to same, and also through the cylindrical box $n$, Figs. 1, 2, and 7, in the top of which it works freely. In the cylindrical boxes $g$ and $n$ is placed an ordinary clock-spring $n'$, the outer end of which is fixed to the box and the inner one to the spindle. Over the box $n$ and fixed to same is placed the music-desk $o$. The arrangement is this: On the spindle $h$, between the pulleys $i$ and $l$, are placed a number of horizontal arms $p$, one above the other, with a thin washer $p'$ between each two to prevent friction. On each arm $p$ are fixed two upright pins or fingers $q$, one at the extreme end of the arm and the other a couple of inches farther in toward the center, Figs. 1, 2, and 3. On each arm a small recess $r$, Figs. 3 and 10, is cut out to allow room for the inner fingers $q$ on the other arms. The arms $p$ are of unequal length in this way, that the length of the uppermost arm reckoned from the center of the spindle $h$ to the outer end is smaller than that of the next arm below from center of spindle to the outer finger $q$, and so on. This arrangement, in connection with the recess $r$, cut out on each arm, allows the arms $p$ to occupy a position one above the other. In the lower horizontal part of the music-desk $o$ are arranged notches $s$ for allowing the fingers $q$ to go back in a line with spindle $h$ and at the same time permitting the music-leaves to rest on the lower part of the desk $o$.

When leaves are to be turned over, the arms $p$, with the fingers $q$, having the leaves arranged between them, Fig. 10, are all occupying a position to the right of the center of the music-desk, and if the uppermost arm $p$ is moved half a turn from right to left the first leaf will be turned, and so on. This movement of the arms $p$ is effected by means of the following mechanism: To the pulley $l$, Fig. 7, is fixed the one end of a cord $t$, which passes in a groove around the pulley $l$, over a small pulley $u$, fixed on box $n$, Fig. 2, and down through the tube $d$, over a small pulley $v$, fixed at the lower end of tube $d$, Fig. 8, and thence over to the side, where a hook fixed to the end of the cord $t$ is hooked onto the eye on the pedal $x$. The cord $t$ is passed around the pulley $l$ in such a manner that the pulley $l$, seen from the top, will move in the same direction as the hands on a clock when the cord is pulled. If the cord is released, the pressure of the spring in the box $n$ will force the pulley $l$ and arm $m$ back in the opposite direction, (from left to right;) but this movement is stopped when the arm $m$ is just above the arms $p$ by the contact of the two stops $y$ and $z$, fixed on the pulley $l$ and box $n$, respectively, Figs. 1 and 7. This position of the arm $m$ is in the following called the "normal" position.

Near the outer end of arm $m$ is bored a hole, through which from the top is inserted a telescope-shaped pin 1, whose uppermost end is too large to pass through the hole. The lower portion of the pin 1, however, is of a sufficiently-reduced diameter to pass through said hole. Over this end of the pin 1 is placed a small hollow cylinder 2, screwed onto the upper side of the arm $m$. This cylinder 2 is made to fit the uppermost end of pin 1 in such a manner that the pin 1 may work up and down inside the said cylinder. Between the top of the cylinder 2 and the upper end of the pin 1 is placed a spiral spring 3, that tends to force the pin downward. On the lower end of pin 1 is fixed the "catcher," Fig. 4, that consists of a long horn 4, bent toward the back and upward, Figs. 3 and 7, and a short horn 5, bent toward the front and upward. Between the two horns 4 and 5 is a small incision 6, that when the arm $m$ is in the normal position catches hold of the back edge of the uppermost arm $p$.

The above-described device works in the following manner: When a player wishes to turn a leaf, he has to press with the knee the pedal $x$ a little to the right. By this movement the cord $t$ is pulled downward and the pulley $l$ turned half a turn. The pulley $l$ carries along the arm $m$, and the catcher, with the incision 6, forces the uppermost arm $p$, having a leaf between its fingers $g$, to turn over from right to left. By turning the pulley $l$ the clock-spring in the box $n$ is put under tension, and as soon as the player releases the pedal $x$ the force of the coiled spring forces the pulley $l$ back to the normal position. When the catcher by the returning movement of arm $m$ is caused to leave the arm $p$, the force of the spiral spring 3 will press downward the pin 1, together with the catcher. Under the returning movement the horn 4 is in front. The free end of this horn is so high up that it can pass over the uppermost arm $p$, and eventually the whole length of the horn 4 passes over this arm, as the strength of the clock-spring in the box $n$ is greater than the strength of the spiral spring 3, and the pin 1 is consequently lifted up again. At the moment the arm $m$ has returned to its normal position the whole of the horn 4 is behind the back edge of arm $p$, and the spiral spring 3 immediately forces the pin 1 so much downward that the incision 6 catches hold of the back edge of arm $p$, and arm $m$, with the catcher, is then again in position to turn the next leaf when required. The apparatus can also turn the leaves back when certain parts of the music has to be repeated by an arrangement like the one described above and that works in the same manner. The arm $j$, fixed on pulley $i$, carries on the free end a telescope-shaped pin 7, exactly like pin 1 and fixed to arm $j$ in the same way, with the only difference that it is turned upside down, so that the spiral spring in the cylinder presses the pin 7 upward instead of downward. A clock-spring arranged inside the box $g$ tends to turn the pulley $i$ from right to left; but as soon as the arm $j$ has reached the position shown in Fig. 3 under the arms $p$, that have already been turned to the left, it is stopped by the contact between the stops 8 and 9, Figs. 3 and 6. This position of the pulley $i$ with arm $j$ is in the following called the "normal" position. When the arm $j$ is in the normal position, the long horn 10 of the catcher is turned backward and slanting downward, Figs. 3, 5, and 6, while the short horn 11 is turned forward and slanting downward, and the incision 12 is catching hold of the back lower edge of the last-turned arm $p$. To the pulley $i$ is fixed the one end of a cord 13. This passes in a groove around the pulley and over a small pulley 14, Figs. 1 and 5, which is fixed over the upper end of the tube $e$, down through this tube, and, after passing over another pulley 15, fixed at the lower end of tube $e$, the end of the cord 13, to which is attached a hook, is hooked onto an eye on the pedal 16. This cord is placed around the pulley $i$ in such a direction that the pulley, seen from above, turns in the opposite direction to the hands on a clock when the cord is pulled downward. If the player wants to turn back a music-leaf, all he has to do is to press the pedal 16 a little to the left. The cord 13 will then turn the pulley $i$, together with the arm $j$, half a turn from left to right. As soon as the player releases the pedal 16 the clock-spring in box $g$ will force the pulley $i$, with arm $j$ and catcher, back to the normal position. During the return movement the pin 7 as soon as it has left the last-turned arm $p$ will again occupy its highest position, it being pressed upward by the spiral spring in the cylinder until the long horn 10 with its free end passes underneath the lowest of the arms *p* to the left. On account of the shape and slanting position of this horn the pin 7 is gradually pressed downward, so that the horn 10 can pass under the arm *p*. The whole of the horn 10 has passed under arm *p* when the pulley *i* has again reached the normal position, and the pressure of the spiral spring in the small cylinder will then press the pin 7 a little upward, whereby the incision 12 gets hold of the back edge of the lowest arm *p*, and the arm *j* is now in position to turn back another leaf, if required. When one of the arms *p* turns from right to left, it will at the finish of the turning knock against the short downward-slanting horn 11, Fig. 5, fixed on the top of the pin 7, and force this downward so much that the incision 12 is drawn away from the back edge of the arm *p*, that was turned over before and was the lowest, down to the back edge of the now turned arm *p*, that is now the lowest. The same thing happens when an arm *p* is turned from left to right. The arm *p* will knock against the short upward-slanting horn 5, Fig. 7, and force the pin 1 so much upward that the incision 6 leaves hold of the right arm *p*, that until then was uppermost, and catches hold of the back edge of the last-turned arm *p*, which is now uppermost.

The leaf-turner is made ready for use in the following manner: Each leaf required to be turned is placed between the two fingers *q* on the respective arm *p*. Fig. 10 shows a plan of a music-desk with a music-book placed on same, as well as six arms *p* with fingers *q*. The leaves 17 to 22 are required to be turned. All the arms *p* are first turned out in front of the music-desk, whereas the leaves to be turned are brought over to the left side. The lowest arm *p* is then turned a little to the right, and the last leaf 22 is placed between the fingers *q* of the said arm—that is, in front of the innermost finger and behind the outer one. When this is done, the arm is pushed back to the right and the next arm *p* is drawn a little to the right. On this is placed the leaf 21 in the same manner as leaf 22, and so on until all the leaves are fixed in position. If only a small number of leaves are required to be turned, these are brought over to the left, and of the arms *p* drawn out in the front the same number is retained. All the rest, which must be the lower ones, are pushed over to the right in front of the leaves not to be turned. The leaves to be turned are now fixed between the fingers *q* in the same manner as described above.

When the leaf-turner is not required any more, the hooks on the ends of the cords *t* and 13 are unhooked from the eyes in the pedals *x* and 16, and the tubes *d* and *e*, with the mechanism on top, can then be lifted out of the holes in the keyboard and the piano be closed.

The drawings show a leaf-turner with six arms; but this number may be increased, if required.

The above-described apparatus can also be used as a leaf-turner on music-stands for violin or brass instruments. In this case the tubes *d* and *e* are arranged to reach almost down to the ground, and the cords *t* and 13 are connected to pedals to be worked by the player's foot.

Having now particularly described and ascertained the nature of this said invention and in what manner the same is to be performed, I declare that what I claim is—

1. A music-leaf turner, comprising a series of pivoted leaf-holding arms, means for shifting them singly, and a catcher for holding the shifted arms stationary, said catcher being mounted to slide yieldingly in a direction substantially perpendicular to the plane in which the said arms move.

2. A music-leaf turner, comprising a series of pivoted leaf-holding arms, two operating-arms arranged to work in opposite directions, independent mechanisms for actuating said operating-arms, and a catcher carried by each of said operating-arms, the catcher on the temporarily active arm serving to shift the leaf-holding arms singly, while the catcher on the temporarily stationary arm serves to prevent a return movement of the shifted leaf-holding arms.

3. A music-leaf turner, comprising a series of superposed leaf-holding arms, two operating-arms arranged to work in opposite directions, independent mechanisms for actuating said operating-arms, and a catcher carried by each of said operating-arms yieldingly and mounted to slide transversely of the planes in which said operating-arms swing, each catcher being provided with hooks facing in opposite directions to engage respectively the leaf-holding arm to be shifted next, and, on the temporarily stationary catcher, the leaf-holding arm just shifted.

4. A music-leaf turner, comprising a series of superposed leaf-holding arms, two operating-arms arranged to work in opposite directions, independent mechanisms for actuating said operating-arms, and a catcher carried by each of said operating-arms yieldingly and mounted to slide transversely of the planes in which said operating-arms swing, each catcher being provided with hooks facing in opposite directions, to engage respectively the leaf-holding arm to be shifted next, and, on the temporarily stationary catcher, the leaf-holding arm just shifted, one catcher being below the leaf-holding arms, and the other above the same.

In testimony that I claim the foregoing as my invention I have signed my name in presence of two subscribing witnesses.

EMIL JULIUS MÖLLER.

Witnesses:
FRITZ TÖYBERG,
ERNEST BOUTARD.